US006321766B1

(12) United States Patent
Nathenson

(10) Patent No.: US 6,321,766 B1
(45) Date of Patent: Nov. 27, 2001

(54) ELECTROMAGNETIC FLOW CONTROL VALVE FOR A LIQUID METAL WITH BUILT-IN FLOW MEASUREMENT

(76) Inventor: Richard D. Nathenson, 5301 Fair Oaks St., Pittsburgh, PA (US) 15217

( * ) Notice: Subject to any disclaimer, the term of this patent is extended or adjusted under 35 U.S.C. 154(b) by 0 days.

(21) Appl. No.: 09/483,611

(22) Filed: Jan. 14, 2000

Related U.S. Application Data

(63) Continuation-in-part of application No. 09/022,163, filed on Feb. 11, 1998, now Pat. No. 6,044,858.
(60) Provisional application No. 60/037,671, filed on Feb. 11, 1997, and provisional application No. 60/116,418, filed on Jan. 19, 1999.

(51) Int. Cl.[7] .......................... F16K 31/02; B22D 11/16; G01F 1/58
(52) U.S. Cl. .................... 137/13; 137/251.1; 137/487.5; 137/827; 164/147.1; 73/861.11; 73/861.15
(58) Field of Search .................... 137/13, 251.1, 137/487.5, 807, 827, 909; 164/147.1; 74/861.11, 861.12, 861.13, 861.14, 861.15, 861.16, 861.17

(56) References Cited

U.S. PATENT DOCUMENTS

| | | | |
|---|---|---|---|
| 2,670,749 | 3/1954 | Germer ............................... | 137/909 |
| 2,707,720 | 5/1955 | Tama ................................... | 137/802 |
| 3,002,383 | * 10/1961 | Mittelmann ....................... | 73/861.16 |
| 3,417,771 | 12/1968 | Ernst ................................... | 137/807 |
| 3,463,365 | 8/1969 | Dumont-Fillon .................... | 222/544 |
| 3,506,023 | 4/1970 | Bogart ................................. | 137/807 |
| 3,581,040 | 5/1971 | Halley ................................ | 164/147.1 |
| 3,695,334 | 10/1972 | Khripkov et al. ...................... | 164/49 |
| 3,701,357 | 10/1972 | Granström et al. .................. | 137/827 |

(List continued on next page.)

OTHER PUBLICATIONS

Jo Isenberg–O'Loughlin, "Getting More Out of Gates and Valves", 33 Metal Producing, May 1986, pp. 31–35.
H. B. Osborn, Jr., "Continuous Casting", Continuous and Pressure Casting, pp. 22–24.
Editors of 33 Metal Producing, "The Birth of the High–Tech Tundish", 33 Metal Producing, Mar. 1986, pp. 25–27 and 30.
R. S. Baker, "Design of an Eddy–Current Brake for a Sodium–Cooled Nuclear Power Reactop", Jul. 1960, pp.330–333.
J. A. Shercliff, "The Theory of Electromagnetic Flow–Measurement", Cambridge at the University Press 1962, pp.98–103.
M. Garnier, "Electromagnetic Devices for Molten Metal Confinement", Progress in Astronautics and Aeronautics, vol. 84, pp. 433–441.
Eiichi Takeuchi et al., "Applied MHD in the Process of Continuous Casting", Publication of TMS Minerals*Metals*Materials, 1992, pp. 189–202.
Igor R. Kirillov et al., "EM–Brakes With Cylindrical Channels", Published by The Iron and Steel Institute of Japan, 1994, pp. 338–343.
Yeou Hsin Wang, "The Effect of the Sliding Gate on the Fluid Flow and Heat Transfer in Continuous Casting", 31 pages.

*Primary Examiner*—John Rivell
(74) *Attorney, Agent, or Firm*—Webb Ziesenheim Logsdon Orkin & Hanson, P.C.

(57) ABSTRACT

An electromagnetic flow control valve for an electrically conductive liquid having a plurality of coils and yokes surrounding a non-metallic, such as alumina, tube through which an electrically conducting liquid, such as liquid metal, flows. Direct current applied to the coils causes retarding forces to be imposed on the flowing liquid. The electromagnetic flow control valve can be used in conjunction with a continuous caster where the electromagnetic flow control valve is in fluid communication with a tundish. Built-in galvanomagnetic probes measure changes in the applied magnetic field to determine the rate of flow of liquid metal through the device.

25 Claims, 7 Drawing Sheets

U.S. PATENT DOCUMENTS

| | | | |
|---|---|---|---|
| 3,770,020 | * 11/1973 | Tamura et al. | 137/802 |
| 3,789,663 | * 2/1974 | Gold | 73/861.06 |
| 3,802,262 | * 4/1974 | Banks | 73/861.11 |
| 4,082,207 | 4/1978 | Garnier et al. | 222/594 |
| 4,137,767 | * 2/1979 | Wada | 73/861.15 |
| 4,216,800 | 8/1980 | Garnier et al. | 137/827 |
| 4,248,085 | * 2/1981 | Coulthard | 73/861.06 |
| 4,308,752 | * 1/1982 | Appel et al. | 73/861.12 |
| 4,324,266 | 4/1982 | Garnier et al. | 137/13 |
| 4,434,666 | * 3/1984 | Hemp et al. | 73/861.12 |
| 4,507,976 | * 4/1985 | Banko | 73/861.54 |
| 4,655,237 | 4/1987 | Gloor et al. | 137/827 |
| 4,736,635 | * 4/1988 | Murase | 73/861.15 |
| 4,805,669 | 2/1989 | Lillicrap | 137/827 |
| 4,842,170 | 6/1989 | Del Vecchio et al. | 222/594 |
| 4,947,895 | 8/1990 | Lillicrap | 137/807 |
| 5,113,890 | 5/1992 | Elizondo-Gonzalez et al. | 137/909 |
| 5,137,045 | 8/1992 | Gerber et al. | 137/13 |
| 5,280,726 | * 1/1994 | Urbanic et al. | 73/861.12 |
| 5,341,102 | * 8/1994 | Akiyama et al. | 73/861.11 X |
| 5,448,920 | * 9/1995 | Ketelsen et al. | 73/861.12 |
| 5,503,027 | * 4/1996 | Hemp | 73/861.12 |
| 5,691,484 | * 11/1997 | Feller | 73/861.13 |

* cited by examiner

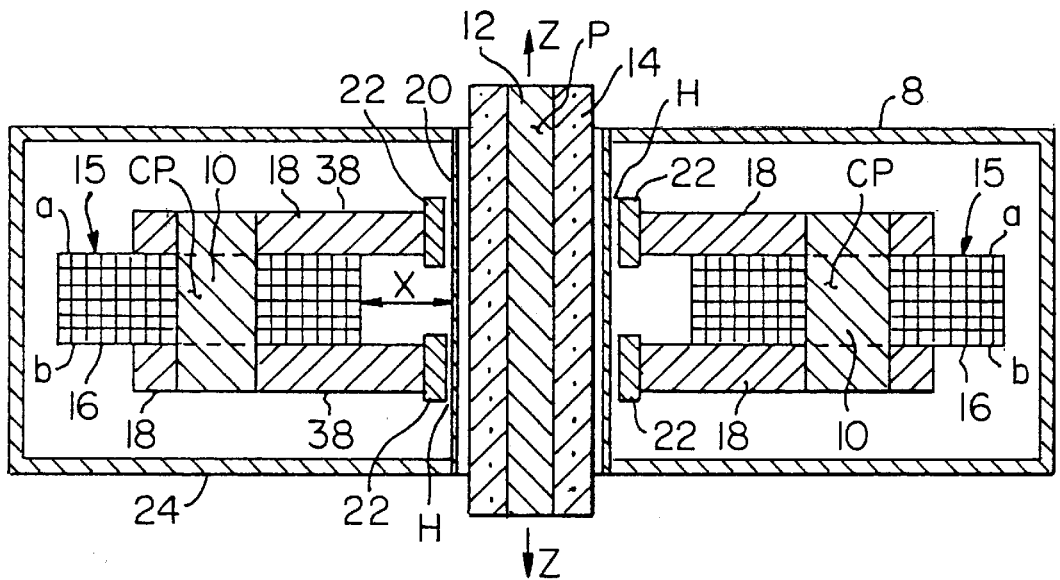
FIG. 4
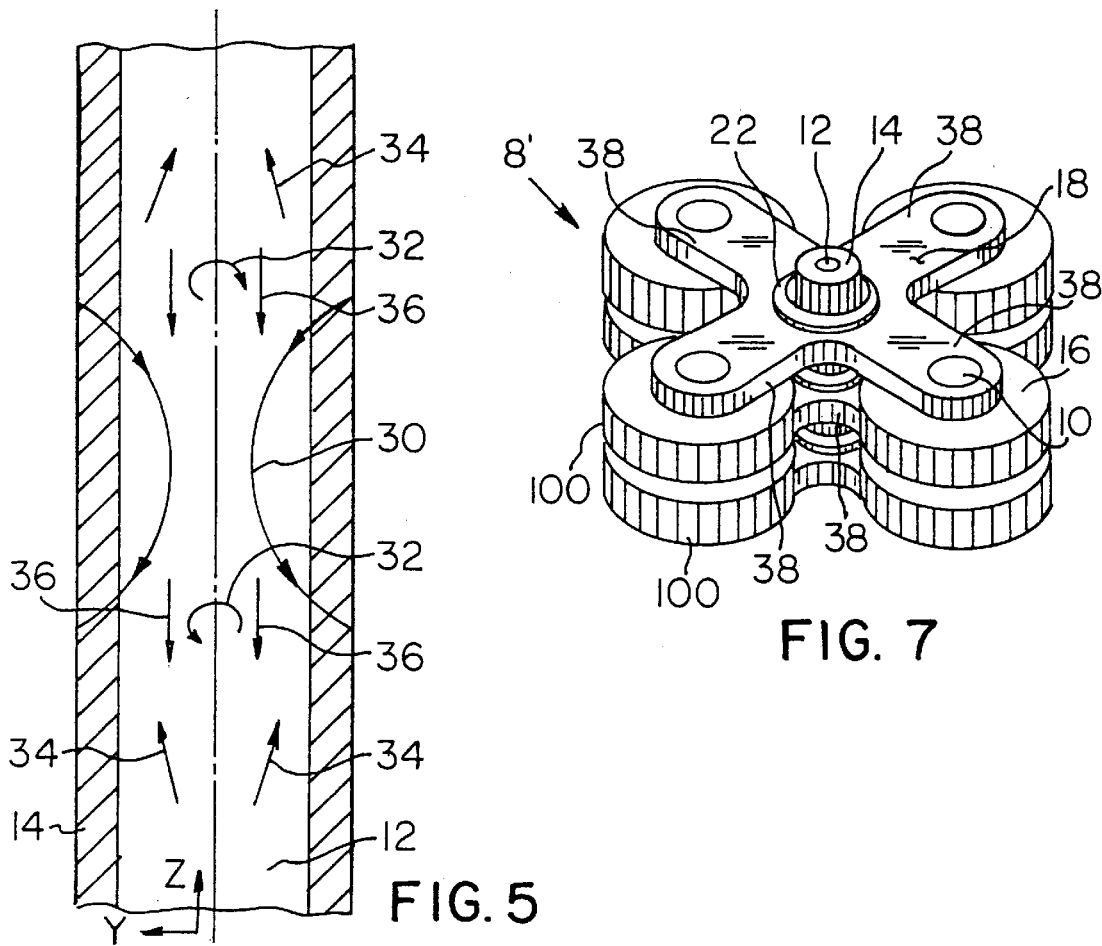
FIG. 5
FIG. 7

ELECTROMAGNETIC FLOW CONTROL VALVE FOR A LIQUID METAL WITH BUILT-IN FLOW MEASUREMENT

CROSS REFERENCE TO RELATED APPLICATIONS

This application claims the benefit of U.S. Provisional Patent Application Serial No. 60/116,418, filed Jan. 19, 1999, and this application is a continuation in part of U.S. Patent Application Serial No. 09/022,163, filed Feb. 11, 1998, now U.S. Pat. No. 6,044,858, which claims the benefit of U.S. Provisional Patent Application No. 60/037,671 filed Feb. 11, 1997.

BACKGROUND OF THE INVENTION

1) Field of the Invention

This invention relates to the electromagnetic control of the flow of and particularly to the measurement of the flow of an electrically conducting liquid.

2) Description of the Prior Art

Molten metal moves often from one vessel to another during industrial processes. Whether it is from a melting or holding furnace to multiple molds in a batch casting process or from a ladle to a tundish to a mold in a continuous caster, in both the ferrous and non-ferrous industries, the control over the flow of the metal is important or key to the process.

The growth of continuous casting in the United States, the emphasis on "clean steel", the rise of ladle and tundish metallurgy, the trend to higher production machines and the need for precise control in innovative casting processes have all increased the importance of flow control in molten steel pouring in particular. According to the magazine, 33 *Metal Producing*, 80% of the steel melted in American furnaces (87 million tons in 1991) passes through a slide gate or valve. An engineering manager of Sumitomo Metal America, Inc. was quoted in 33 *Metal Producing* as stating that if a magnetic field controlled the rate of flow, one could eliminate conventional metering or throttling systems and reduce costs. Inland Steel has recently cited the possibility of the use of electromagnetic force to reduce the alumina clogging problem in slide gates. In the steel ingot casting and non-ferrous metal industry, a similar need is felt. Although smaller than the steel production cited above, the combined aluminum and copper production in the United States in 1991 was still approximately six million tons.

Today, the state-of-the-art of molten metal flow control in industrial processes continues to be by mechanical devices. Three major types of conventional flow control devices are used at the discharge of a furnace, holding vessel or tundish: a metering nozzle, a stopper rod or a slide gate. A metering nozzle is a specially contoured hole through a ceramic block. For a gravity driven flow, the flow rate is simply proportional to the square root of the head of the molten metal above the nozzle and to the square of the nozzle throat diameter. The stopper rod is basically a blunt ended rod suspended above a nozzle and configured with a manual or automatic mechanical means for raising and lowering. The flow rate can be varied from fully open to fully closed using a stopper rod. The slide gate is primarily a hydraulically operated mechanism that basically consists of several stacked ceramic plates, each with a central hole therethrough. The holes may be aligned to allow the flow or misaligned to stop the flow. Both linear and rotary versions are available. Slide gates are predominately used on furnaces and ladles because of their ability to hold high heads for long periods of time. However, none of these mechanical means by themselves can fulfill the additional role of measuring the metal flow.

A particularly critical flow control location of great practical significance is from the tundish to the mold in a continuous casting machine for making steel. As schematically shown in FIG. 1A, a tundish 4 is an intermediate, shallow vessel that provides several functions in a continuous casting machine. Receiving molten metal from a transfer ladle from the furnace, the tundish 4 distributes the molten metal through multiple bottom openings to individual molds. Multiple ladles may be sequenced using the capacity of the tundish as a reservoir. Also, the tundish provides a residence time to allow metal inclusions to float out. According to a 1986 survey, the metering or free flow nozzle is used on approximately half of the total tundishes in the overall United States steel industry; while stopper rods and slide gates are each used on about one-quarter of the steel tundishes, respectively.

One of the prime functions of a tundish is to provide a controlled, uniform flow. A rough stream has a higher surface to volume ratio and, hence, a higher propensity to reoxidize by direct contact with the air. Further, a rough stream will entrain more air and carry it into the mold resulting in disadvantageous turbulence, foaming and sloshing. With a turbulent pool, new steel is continuously brought to the surface for further contact with air. Very little time is left for proper separation of impurities. Also, oxides tend to be thrown to the outside of the mold where they can be trapped in the surface of the strand. Excessive turbulence in the molten crater of the strand can also be a potential cause of a breakout through the shell.

Both stopper rods and slide gates tend to produce rough streams. Also, slide gates and stopper rods are both subject to clogging when casting aluminum killed steels. Toward the end of a sequence cast, the accuracy of flow control gets worse especially with a stopper rod as the flow area between the rod and the nozzle block becomes fouled. Stream flaring occurs in a slide gate 95% of the time during a heat sequence because the slide gate needs to be in a semi-open position to regulate the flow. The stream exiting the top portion of the slide gate at an angle translates into a circular motion through and exiting the slide gate.

Metering nozzles also suffer from operational problems. The only way to control flow with a metering nozzle is to control the tundish level height, but this is slow and insensitive being a square root function of the head. Other considerations, such as inclusion float time or vortexing, tend to make changes in tundish level undesirable from a quality standpoint. Generally, for a billet caster, nozzle life limits the sequence length. Depending of the specific casting conditions, the nozzle either erodes to the point that the flow rate increases over the allowable limit for the machine or clogs with alumina which also limits casting. Clogging, importantly, now limits the types of steel that may be cast. Further, the only way to stop flow through a metering nozzle is to manually insert a chill plug to freeze the flow. Typically, in the steel industry, this plug must be burned out with an oxygen lance to restart the flow, often damaging the nozzle.

A continuous casting operator is market driven to meet one or more of the following needs: (1) to meet the quality specifications of the grades being cast; (2) to diversify by moving into casting improved grades of steel; (3) to reduce the current cost of casting a given grade of steel; (4) to increase the yield of prime billets, i.e., to reduce waste; and/or (5) to upgrade machinery as it ages to continue to compete in the market.

An electromagnetic flow control device in lieu of the conventional flow control devices has direct bearing on all of these market drivers. The ability to additionally measure the flow rate while controlling it is a distinct advantage to the operation of the caster. As part of an overall caster control system, it does so in a number of important ways to improve process control, improve quality, increase productivity and reduce cost.

When compared to metering nozzles, an electromagnetic flow control device (1) offers the operator of a billet caster the opportunity to now control the flow through the caster rather than react to it; (2) provides independent control over the casting rate to meet tight specifications on the heat removal rates in all commercial grades; (3) provides a greater degree of control over that of changing the tundish level height which is slow and insensitive; (4) offers independent flow control on each nozzle to compensate for uneven nozzle wear or clogging among the multiple strands in a caster fed from the same tundish; and (5) gives the operator the capability to adjust flow independent of strand motion changes to maintain a constant mold level height which is so important to good quality.

Since 95% of the flow control in the minimill market is by metering nozzle, these advantages are particularly important. The minimill sector is no longer just the low cost producer of rebar. Higher quality billets for structural shapes and special bar quality (SBQ) are being produced regularly. The ability to counter the traditional nozzle blockage problem of aluminum killed steels via the controlled flow and heat addition capability of an electromagnetic nozzle opens up markets currently not available to the minimills. In the minimill industry, a number of billet casters were put into service originally in the 1960s and 1970s. These machines are in need of upgrades to the current state-of-the-art to compete today.

When compared to stopper rods or slide gates, electromagnetic flow control (1) regulates flow without introducing stream roughness and the subsequent mold turbulence, reoxidation and impurity entrapment; (2) eliminates sites where stream velocity changes abruptly which then causes inclusions to accumulate; (3) eliminates the mechanisms needed to move the rod or plates which are subject to wear and failure; and (4) allows a higher number of sequential casts through increased nozzle reliability and performance which results directly in higher productivity and cost savings.

An electromagnetic flow control device can perform a number of beneficial functions that current metering nozzles, stopper rods or slide gates cannot by: (1) electromagnetically improving the steadiness of the pouring stream eliminating turbulence from the ladle stream and the tundish resulting in improved quality; (2) providing additional heat directly at the nozzle to reduce the tendency for inclusion deposition and the possibility of freezing; (3) applying heat at the nozzle electromagnetically to remelt a strand if it has been deliberately frozen off avoiding the damage typically done by an oxygen lance; (4) giving a greater capacity to deal properly with hot or cold heats; and (5) permitting larger tundishes having a greater depth to minimize vortexing and to maximize inclusion float through offsetting the extra head caused by the larger tundishes.

Electromagnetic flow control with flow measurement are also believed to improve performance over the current mechanical flow control in the following ways: (1) it permits a computer to have better and more responsive control over the metal flow rate through the caster to better match the furnace; (2) it achieves more uniformity from cast to cast by reducing the reliance on individual operator's skill and potentially the number of operators needed; and (3) it reduces costly events, such as breakouts, nozzle lancing and caster turnarounds, with the subsequent upturn in strand yield.

An early reference in the metals industry to the use of electromagnetic flow control was in 1960. It involved the use of a 300 kilowatt, 3,000 hertz induction tundish heating system with two coils, one for main body and one for the spouts. While the body coil primarily provided constant temperature control of the metal, the spout coil provided an additional stabilizing effect on the pouring stream preventing splashing and thus, helping to maintain a "quiet" level in the top of the mold. Takeuchi et. al., at the 1992 TMS Symposium on Magnetohydrodynamics in Process Metallurgy summarized descriptions of linear and rotary ac motors to control the pouring rate from a vessel. Kirillov and Vitkovsky, at the Nagoya International Symposium of Electromagnetic Processing of Materials (1994), discussed Russian electromagnetic brakes for liquid metal flow regulation.

Baker, "Design of an Eddy-Current Brake for a Sodium-Cooled Nuclear Power Reactor", AIEE Winter Meeting (1960), New York, N.Y, describes the use of a rectangular directing current (dc) flow brake to retard the flow in a liquid metal reactor after a shutdown or scram. Baker's device includes a flattened section of stainless steel pipe suspended between the poles of a conventional C-shaped, iron electromagnet. The working fluid is sodium. Both the rectangular shape of the flow passage and the stainless steel material for the tube are not readily practical for most metallurgical metal pouring situations. Shercliff, *The Theory of Electromagnetic Flow Measurement,* Cambridge University Press (1962), describes a variation of this dc device. It includes a single axisymmetric coil surrounding a round pouring tube. An iron flux return donut surrounds the coil reducing the reluctance of the magnetic circuit. In practical application for controlling the flow of a steel stream exiting from a tundish, Shercliff's device does not allow sufficient space for the electric coil. As the resistance losses depend on the available cross-sectional area of the coil, as disclosed by Shercliff, the axisymmetric device also requires an impractically high power to operate. The coil is also located directly next to the pouring tube which will be at a greatly elevated temperature. Cooling of the coil becomes difficult due to the heat transferred from the tube and internally generated by the resistive losses.

Many U.S. patents describe electromagnetic flow control arrangements. U.S. Pat. No. 2,707,720 discloses a container with an opening in the bottom near the wall and surrounded by an electric coil. An alternating current applied to the coil forces the molten metal to move away from the opening by an induced magnetic pressure. U.S. Pat. Nos. 3,463,365 and 3,701,357 describe devices where an external current is passed through a liquid metal, which then interacts with an externally imposed magnetic field to generate a force component retarding the flow of liquid metal. U.S. Pat. No. 3,695,334 describes the use of a rotating electromagnetic field to generate rotational motion and a radial pressure gradient in a container with a liquid metal inlet at the outer periphery and exit at the central axis. U.S. Pat. Nos. 4,082,207 and 4,324,266 disclose an alternating current winding and an electrically conductive screen to constrict the jet of molten metal at the outlet of a nozzle. U.S. Pat. Nos. 4,805,669 and 4,947,895 disclose electromagnetic valves with specially shaped internal discharge passageways surrounded by induction coils supplied with a high frequency, alternating current. U.S. Pat. No. 4,842,170 teaches a device with an alternating current electromagnetic coil surrounding a nozzle orifice with a central portion designed to allow eddy currents to flow in certain regions and not in others resulting in an axially directed force to impede the flow. Finally, U.S. Pat. No. 5,137,045 discloses an alternating current electric coil surrounding a descending stream to optimize magnetic pressure versus power loss. None of these patents, however, deal with the issue of how to measure the flow rate of the metal simultaneously with controlling the flow of metal.

It is instructive to note how the above patents representing the state of the art in previous electromagnetic flow control specifically apply a magnetic field vector B and an electric current density vector J to generate a body force vector F via the vector Lorentz Law, $F=J\times B$. In these patents, the fields and currents may be alternating (ac) in time and/or in space or steady (dc). The current may be internally generated by induction or by an externally applied electric potential. U.S. Pat. Nos. 2,707,720; 4,082,207; 4,324,266; 4,805,669; 4,947,895; 4,842,170; and 5,137,045 utilize single coils supplied with high frequency alternating current to create a time varying, spatially fixed magnetic field. The time variation of the magnetic field results in an electric field according to Maxwell's Equations. In an electrically conducting fluid, the electric field causes eddy currents to flow in the fluid. As stated above, the interactions of the eddy currents and the imposed magnetic field result in electromagnetic body forces exerted on the fluid. The steady component of the body force effectively confines or retards the flow as desired. The time alternating component is not generally useful since it changes too fast for the fluid to follow. The Takeuchi et al. article and U.S. Pat. No. 3,695,334 describe multi-coil, multi-phase ac devices where the magnetic field moves in a rotary or linear fashion. Here, the body forces from the eddy currents try to make the fluid catch up with the field, analogous to the slip of the rotor in a conventional induction motor. U.S. Pat. Nos. 3,463,365 and 3,701,357 use the variation of applying an external electric potential to generate the current.

The systems described above in the technical and patent literature have had inherent practical limitations which have prevented their application on an industrial basis, especially in the steel industry. Given the actual metal types, sizes and flow rates of industrial metal pouring situations, devices which use an individual coil carrying a single phase current, such as described by U.S. Pat. Nos. 4,805,669; 4,947,895; 4,082,207; or 4,324,266, need to operate at high frequencies, typically from several thousand to tens of thousands of cycles per second. This is basically to match the skin depth of field penetration where the eddy currents flow relative to the size of the flow stream. Special power supplies are needed to generate the high frequency current from the standard power line supply. Inductive and capacitive matching is needed between the supply, the coil, and the molten metal load. The real and reactive power that needs to be supplied to the system to overcome the losses of the applied and induced eddy currents is in general very high, often hundreds of kilowatts. Buswork connecting the coil to the supply must be low in resistance and inductance, meaning large parallel copper buswork or coaxial copper cables. Generally, because of the high power, the coil and the power cabling must be water cooled. Cooling the coil is already difficult due to the necessity to have it in very close proximity to the elevated temperature of the molten metal. Some devices, such as described by U.S. Pat. No. 4,842,170, also need to insert a specially shaped, non-conducting plug into the flow passage to direct the metal flow or eddy currents in a special way. Such plugs are subject to erosion, clogging or thermal failure, especially when dealing with molten steel. The transfer of electrical current into a device, such as described by U.S. Pat. No. 3,463,365 for a high temperature molten metal, such as steel, is hampered by the lack of suitable electrode materials. The currents must be high to effect the level of retarding pressure required. The point in a metal pouring process where flow control is desired is unlike that of an electric arc furnace where high losses, heating and arcing can be tolerated. The rotating field device described in U.S. Pat. No. 3,695,334 requires high fluid peripheral velocities to offset practical heads and is not suitable where the flow is desired to be as quiescent as possible. The flow passages in metal pouring are, in general, too small for linear ac pumps to be practical.

All of these factors tend to make these kinds of systems complicated and expensive. These factors have severely limited their practical application for flow electromagnetic control. None of the above systems additionally addressed the measurement of the flow simultaneously with the flow control of the liquid metal As described below, the present invention overcomes the disadvantages of the ac induced and externally applied current flow control devices cited earlier. The present invention also improves on and eliminates the deficiencies of the dc flow brakes known to date. Further objects and advantages of the invention will become apparent from a consideration of the drawings and ensuing description.

Therefore, it is an object of the present invention to provide an electromagnetic flow control device that does not require high frequency alternating current for operation. It is a further object of the present invention to provide an electromagnetic flow control device that does not require any kind of special internal passage member to direct the flow. It is a further object of the present invention to provide an electromagnetic flow control device that is compact in size, readily manufacturable and is low in cost. It is another object of the present invention to provide an electromagnetic flow control device that does not require high power for operation.

Incorporating a means to measure the flow rate per strand of steel directly during continuous casting has great advantage to the plant operator. Electromagnetic flow meters are well known in the art. U.S. Pat. No. 3,002,383 to Mittlemann describes a typical device that applies a magnetic field across the flowing fluid and reads the emf induced perpendicular the velocity and field. Shercliff in his book on electromagnetic flow measurement describes a transverse field flow meter, as Mittlemann, along with an axial current meter for pipe flow. He also describes induction velometry, pressure drop meters, force meters and other inducted field flow meters.

It is yet another object of the present invention to provide an electromagnetic arrangement to measure flow of liquid metal or other electrically conductive liquid for use with a flow control device.

SUMMARY OF THE INVENTION

My invention is an electromagnetic flow control valve with a flow measurement arrangement that includes a tube and a plurality of electric coils. The tube defines a central passageway adapted to permit an electrically conductive liquid to pass therethrough. The plurality of electric coils is positioned about a circumference of the tube. The coils are formed of electrically conductive wire whereby passing electric current through the wires of the coils causes a magnetic field to be formed in the passageway which retards a flow of electrically conductive liquid through the central passageway.

The tube is transparent to a magnetic field and can be made of a ceramic material, such as alumina.

Each of the coils defines a coil passageway and each of the coils receives a core in the coil passageway. The core includes a high permeability material, such as iron.

Preferably, end plates are provided and each of the coils has a first end and a second end where the end plates sandwich the coils between the first ends and the second ends. Each of the end plates is made of a high permeability material, such as iron. The end plates can include a plurality of projections, such as lobes. Each of the coils receives a core in a coil passageway defined in respective ones of the coils. Respective ones of the cores coact with a respective pair of the projections.

Two longitudinally spaced apart annular shaped pole rings attach to respective ones of the end plates. The tube passes through the pole rings.

My invention is also a continuous caster for an electrically conducting liquid that includes a ladle, a tundish in fluid communication with the ladle and the above-described electromagnetic flow control valve where the tube is in fluid communication with the tundish.

My invention is also a method for controlling the flow of an electrically conducting liquid that includes the steps of: passing an electrically conducting liquid through a tube that is transparent to a magnetic field; directing a plurality of circumferentially positioned magnetic fields toward the tube; and controlling the flow of the electrically conducting liquid by the strength of the magnetic fields. The method can further include that the circumferentially spaced magnetic fields are provided by a plurality of circumferentially spaced electric coils.

My invention is also a flow meter for measuring an electrically conductive liquid that can be used in conjunction with the above described apparatus. The flow meter includes a tube, a plurality of Hall sensors and an arrangement for combining signals generated by the Hall sensors to determine flow rate through the tube. The tube defines a central passageway adapted to permit an electrically conductive liquid to pass therethrough. The Hall sensors are positioned axially along the tube.

My invention is also a method for the measurement of flow rate of an electrically conducting liquid that includes the steps of: passing an electrically conducting liquid through an axially extending tube that is transparent to a magnetic field; measuring magnetic field of the electrically conductive liquid at least two axially spaced points along the tube; and determining the flow rate of the electrically conduction liquid through the equation:

$$Q = K \cdot \sigma \frac{(B_e - B_i)}{(B_e + B_i)} \cdot A$$

where

Q=flow rate of the electrically conductive liquid
K=an empirical constant
σ=electrically conductivity of the electrically conductive liquid
$B_i$=the net inlet magnetic field
$B_e$=the net exit magnetic field
A=the cross-sectional area of the tube

BRIEF DESCRIPTION OF THE DRAWINGS

FIG. 4 is a section taken along lines IV—IV of FIG. 3;

FIG. 5 is a section taken along lines V—V of FIG. 3 showing a pattern of magnetic flux lines, eddy currents, velocities and forces on metal flowing through a central tube of the electromagnetic flow control valve;

FIG. 7 is a top perspective view of a portion of a second embodiment of an electromagnetic flow control valve;

DESCRIPTION OF THE PREFERRED EMBODIMENTS

Figure 1A:
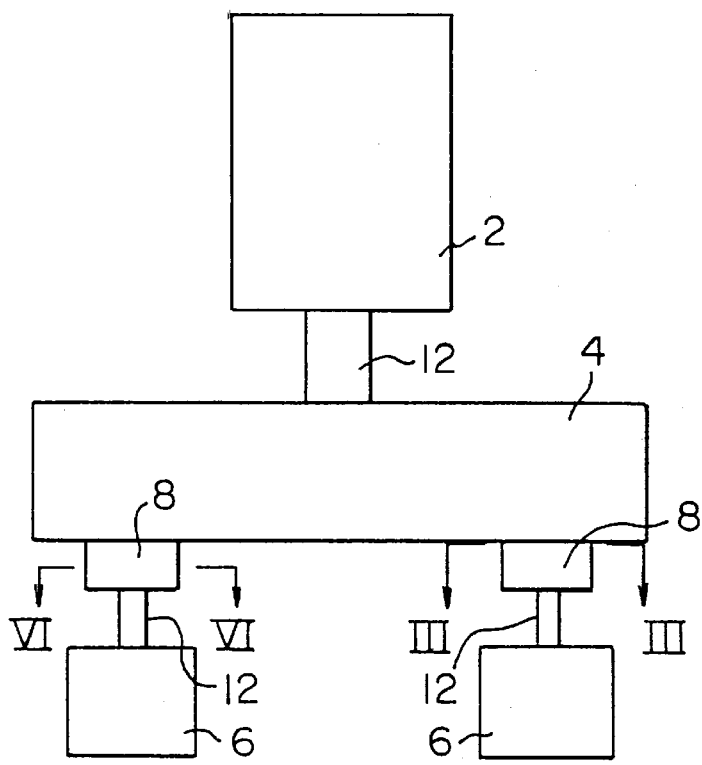
FIG. 1A is a schematic view of a continuous casting machine for steel having an electromagnetic flow control valve made in accordance with the present invention.

The basic equations for the electromagneto-dynamics of fluids may be described using the standard magnetohydrodynamics (MHD) approximations. Maxwell's Equations become:

$$\nabla \times E = -\frac{\partial B}{\partial t}$$

$$\nabla \times H = J$$

$$\nabla \cdot J = 0$$

$$\nabla \cdot B = 0$$

Ohm's Law is:

$$J = \sigma(E + V \times B)$$

The magnetic constitutive equation is:

$$B = \mu_0(H + M)$$

The fluid equations for continuity and motion are standard except for the addition of the J×B body force term:

$$\partial \rho / \partial t + \nabla \cdot (\rho V) = 0$$

$$\rho \left[ \frac{\partial V}{\partial t} + \nabla \left( \frac{V^2}{2} \right) - V \times (\nabla \times V) \right] = -\nabla P - \rho \nabla \varphi + \nabla \cdot \tau' + J \times B$$

The majority prior of the art devices described earlier primarily generate the current density J through the electric field term E in Ohm's Law. As stated before, E comes from the variation of the magnetic field B with time or is applied externally. In general, in these devices, the back emf, i.e., the V×B term in Ohm's Law, is of little or secondary influence. However, as described earlier for eddy current brakes it becomes the primary term to generate the current density J and, hence, the body force F. In my invention of this type, since the flow and field are steady state, the derivative terms with respect to time vanish in the above set of equations. As the problem is also axisymmetric, any peripheral variations are zero. Thus, the body force F, magnetic field B and velocity V can be simply related in the axisymmetric dc device as follows. Using F=J×B and J=σ(E+V+B) where E=O, results in F=σ (V×B)×B, which reduces the number of components since $F_\theta$ $B_\theta$ and $V_\theta$ are zero, $$\begin{bmatrix} Fr \\ Fz \end{bmatrix} = \sigma^* \begin{vmatrix} -Bz^2 & Br*Bz \\ Br*Bz & -Br^2 \end{vmatrix} * \begin{bmatrix} Vr \\ Vz \end{bmatrix}$$

where r and z are component designations and σ is the fluid electrical conductivity. Since the primary velocity in the device is in the axial z direction, the retarding force, −Fz, is to first order proportional to the fluid conductivity, the axial velocity, and the square of the radial field. As can be seen from the above matrix equation, there is some cross coupling of the radial and axial fields and flows. I have conducted detailed numerical modeling of the problem to date which has shown that the coupling effects are of a second order.

Shercliff gives an order of magnitude estimate for the flow drag in a axisymmetric device as follows:

$$\Delta P \cong \sigma B^2 V a$$

ΔP=Pressure Drag
σ=Conductivity
B=Radial Magnetic Field
V=Velocity
a=Pipe Radius This formula assumes that the axial extent of the field is approximately the same as the pipe diameter and that the average value of the radial magnetic field squared is one-half of the maximum. Note the similarity between Shercliff's equation and this equation for the axial force given above. The Table below shows the estimated pressure drag for steel, aluminum and copper in some reference casting situations where some of the head in the tundish is offset by the drag through the flow control device.

TABLE

| Metal | Resistivity (μΩ-cm) | Velocity (ft/sec) | Magnetic Field (T) | Diameter (in) | Pressure Drag (psi) |
|---|---|---|---|---|---|
| Steel | 137 | 6.6 | 0.8 | 3.1 | 4.8 |
| Aluminum | 20.5 | 1.6 | 0.4 | 3.1 | 2.3 |
| Copper | 21 | 1.6 | 1.0 | 1.6 | 7.0 |

The control of the flow in a steel continuous caster is one of the most difficult applications for several reasons. The liquidus temperature of molten steel is significantly higher than non-ferrous metals. The electrical resistivity of molten steel is about seven times that of molten aluminum or copper. Molten iron is also approximately three times as heavy as molten aluminum. Heads to be offset in steel casting can also be higher than for other liquid metals. All of these factors require a significantly higher retarding head to be produced for the steel application. Hence, a practical device for steel would then have ready application for many non-ferrous metals.

Figure 1B:
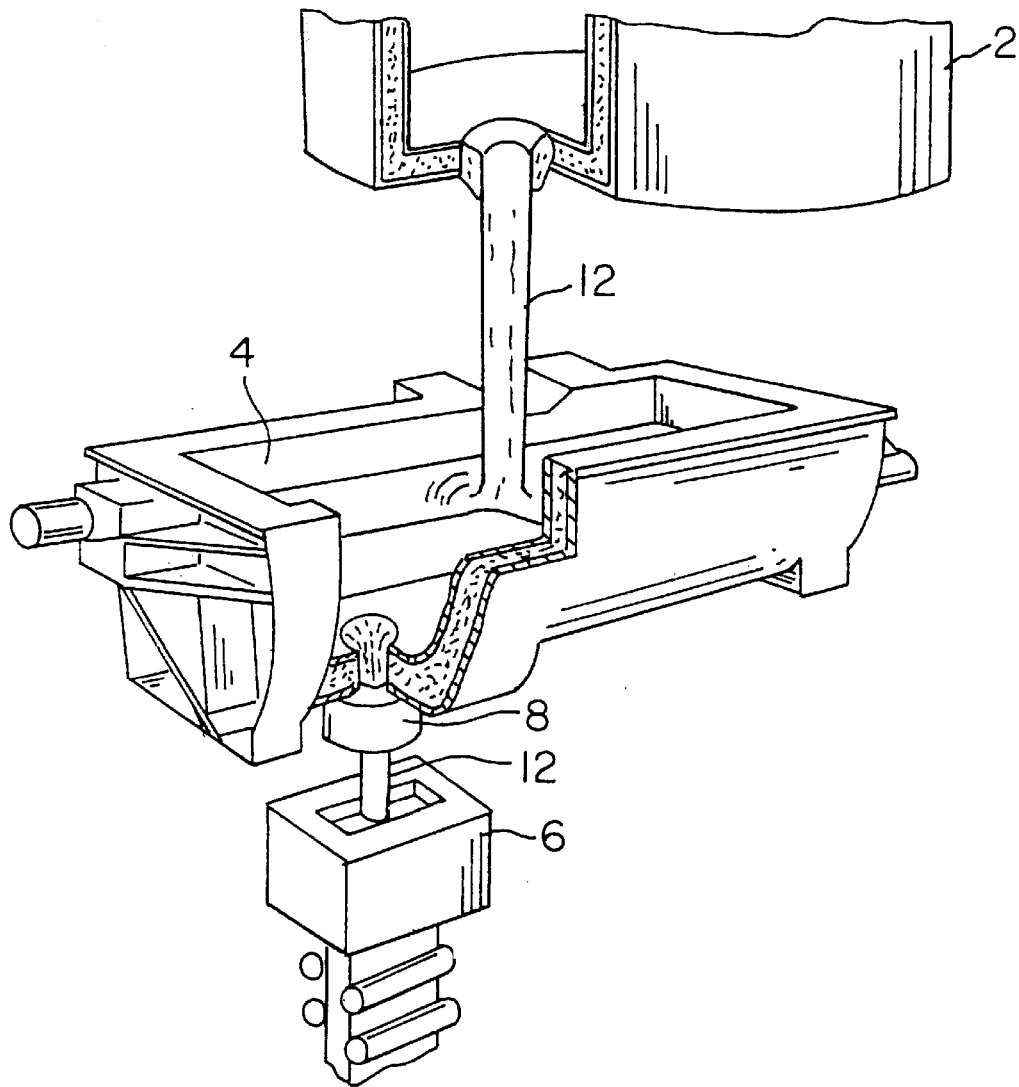
FIG. 1B is a perspective view, partially in section, of a continuous caster similar to the caster shown in FIG. 1A having only one electromagnetic flow control valve made in accordance with the present invention.

FIGS. 1A and 1B show the flow of steel in a modern continuous caster incorporating the present invention. Liquid molten steel 12 from ladle 2, which is in fluid communication with a tundish 4, pours first into the tundish 4. From the tundish 4, the liquid molten steel 12, in turn, pours into molds 6. For a slab caster, there may only be one nozzle exit per tundish; while for a bloom or typical billet caster, one tundish can feed several molds simultaneously as shown in FIG. 1A. Electromagnetic flow control valves 8 fit to the bottom of the tundish 4 and surround each of the discharging liquid molten steel streams 12.

Figure 2:
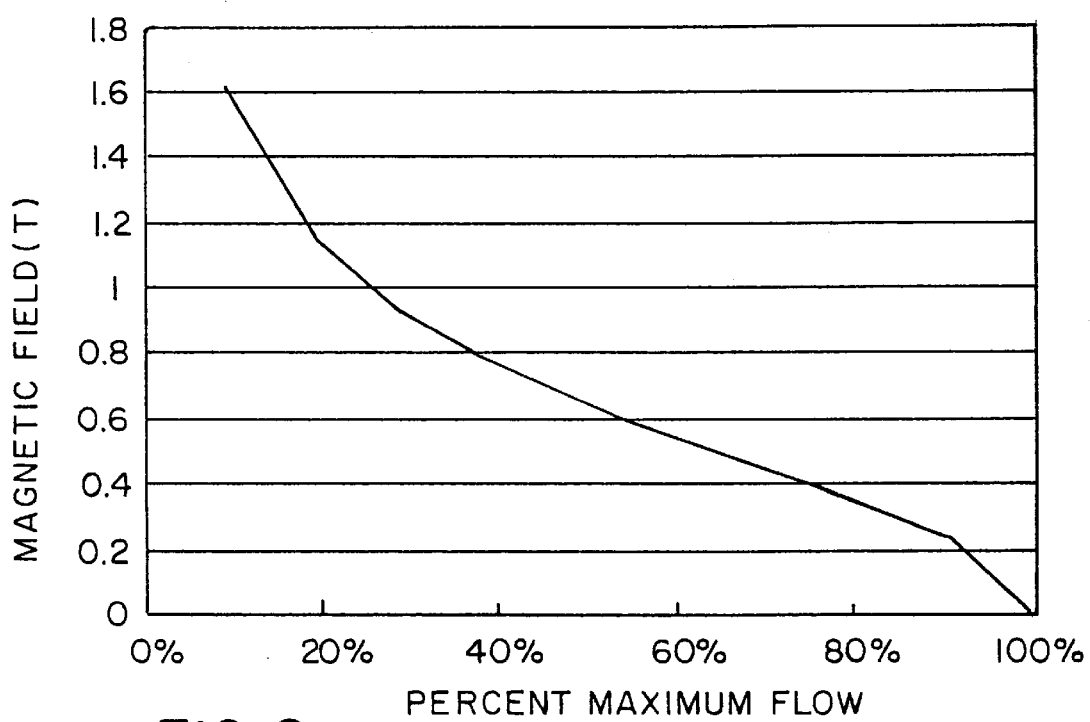
FIG. 2 is a graph of percent flow versus magnetic field strength for a steel continuous caster having an electromagnetic flow control valve.

FIG. 2 shows how the magnetic field would be varied according to Shercliff's formula to control the casting rate from 100% to 10% in an example dual strand slab caster at, for example, the USS Edgar Thomson Plant, Braddock, Pa. This caster has an annual capacity of 2.6 million tons of steel slabs from 8 to 10 inches thick by 28 to 65 inches wide. The normal operating head in the tundish is 48 inches. The flow control is quite good, down to about 10% maximum flow rate. Below that, the fields required become large relative to those generated conveniently with standard iron cores. Although the flow cannot be made to go to zero electromagnetically, this in practice is not a problem. A simple, mechanical backup, such as a guillotine gate, for complete shutoff would be provided for safety.

Figure 3:
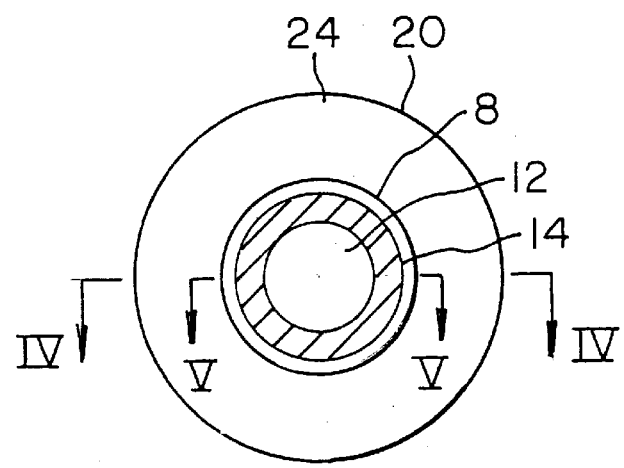
FIG. 3 is a top plan view, partially in section, of the electromagnetic flow control valve shown in FIG. 1A.
Figure 6:
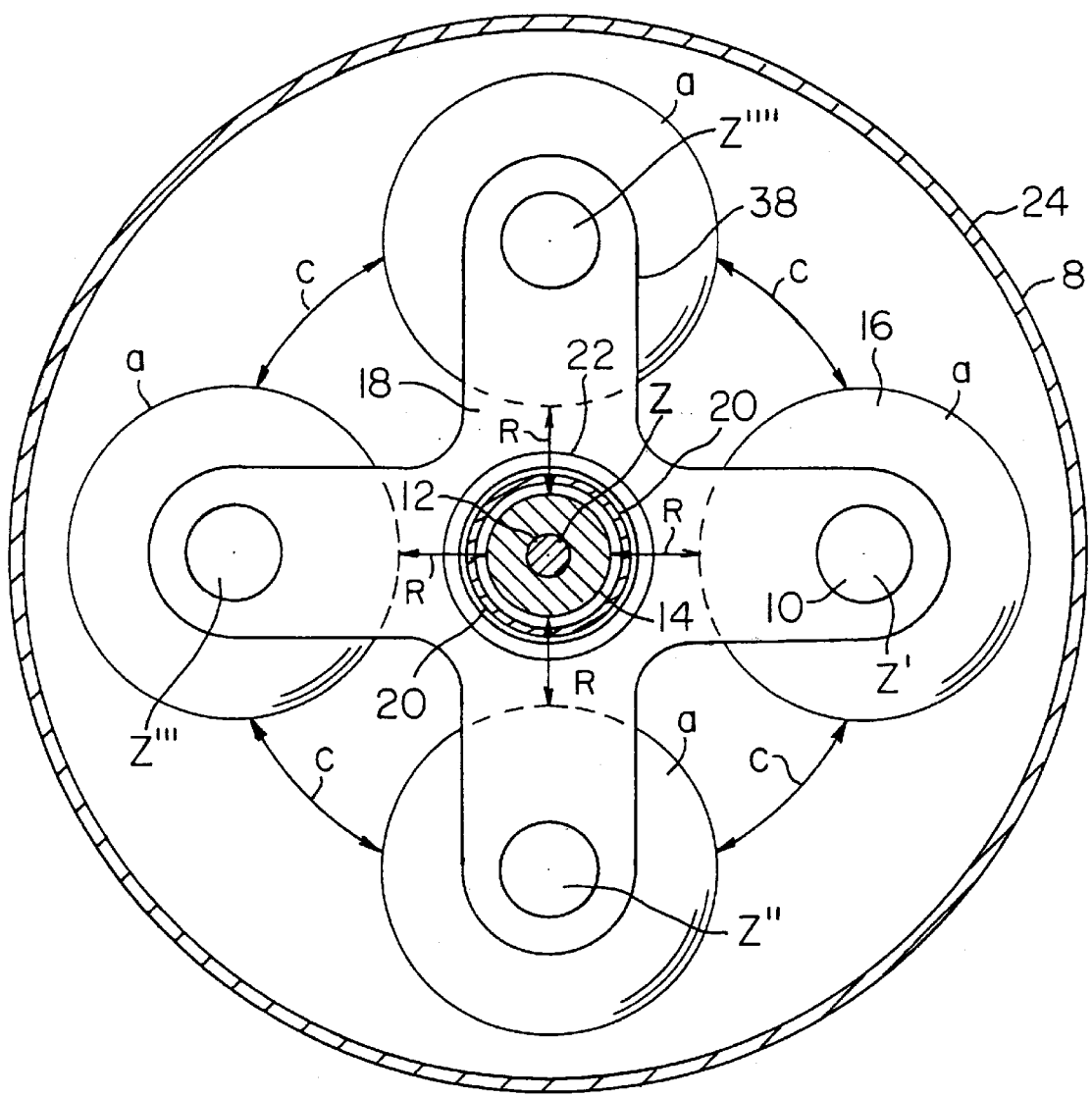
FIG. 6 is a section taken along lines VI—VI of FIG. 1A.

FIGS. 3, 4 and 6 show the electromagnetic flow control valve 8 made in accordance with the present invention. Liquid molten steel 12 or other electrically conductive liquid flows or passes for reference downward under gravity through a central tube 14 extending along a longitudinal axis Z. The central tube 14 is in fluid communication with the tundish 4. The central tube 14 includes a central passageway P and is straight and of a constant thickness as conventionally employed in casting. It is preferably made of a standard ceramic material, such as alumina. As such, it can withstand the high temperature of the liquid molten steel 12; yet be transparent to the magnetic field. Importantly, no obstruction needs to be placed on the inside of the central tube 14. Radially surrounding the central tubes 14 are a multiplicity or plurality of assemblies 15 each having an electric coil 16, a coil core 10 and end plates or yokes 18. The electric coils 16 are torrid shaped and made of wound electrically conductive wire or copper wire in a manner well known in the art and are disposed a distance X from the hot central tube 14 reducing radiant and convective heat transfer. A plurality of electric coils 16 is positioned circumferentially C from the central tube 14 and a radial distance R from the tube. An intermediate metal heat shield 20 made of reflective stainless steel or a highly thermally resistive material, such as woven ceramic fibers, can be placed around the central tube 14 to help reduce the heat load. Each of the electric coils 16 defines a coil passageway CP that receives the coil core 10. Each of the electric coils 16 includes a first end a and a second end b. The end plates 18 sandwich the electric coils 16 between the first end a and second end b of the electric coils 16. The end plates 18 and coil cores 10 are preferably composed of a high permeability material, such as iron. Since the magnetic field is steady, the magnetic structure need not be laminated for electrical reasons. Each of the end plates 18 is connected to the coil cores 10. Each end plate 18 connects to or attaches to one of two interior pole rings 22. The pole rings 22 are specially shaped, in this case, annular shaped or ring shaped, to direct the flux into the central tube 14 both axially and radially. The pole rings 22 may be made of a higher permeability alloy, such as iron cobalt, since the magnetic flux density is highest at these places. The central tube 14 passes through the pole rings 22 through holes H defined by the pole rings 22. A shell or casing 24 surrounds the assemblies 15 and provides mechanical support and integrity for the entire device. A suitable attachment arrangement, such as bolts, pins, plugs or any other type of attaching arrangement, is provided to the exterior of the shell 24 to the bottom of the tundish 4.

FIG. 5 shows patterns of magnetic field lines B designated as reference numeral 30, eddy currents J designated as reference numeral 32, axial body forces F designated as reference numeral 34 and velocity vectors V designated as reference numeral 36 on a radial plane passing through the device. The axial body forces 34 are generated primarily in the end regions of the electromagnetic flow control valve 8 to retard the flow in the end regions. The end shape of the pole pieces is arranged to maximize the radial direction of the magnetic field lines 30. The eddy currents 32 flow in a peripheral direction making closed loops. The axial body forces 34 being the vector cross product of the current density and magnetic field are mutually perpendicular to both the flux line and eddy current 32 at each point. Although the directions of the magnetic flux and eddy currents are opposite in each end region, the generated axial body forces 34 always oppose the flow. From the matrix equation, the sign of Br, the radial flux component does not matter since the force depends on $Br^2$. Because of the minus sign, the force always opposes the flow.

Referring back to FIGS. 4 and 6, four assemblies are shown. Each of the end plates 18 includes four projections, such as four lobes 38, where each electric coil 16 is sandwiched by a pair of lobes 38 of end plates 18. Each of the coil cores 10 coact with a respective pair of the lobes 38, such as by contacting the lobes 38 or being in close proximity to the lobes 38 so that the lobes 38 electromagnetically coact with the coil cores 10. Each of the lobes 38 is secured to each other for a respective end plate 18. Each assembly 15 includes a spaced apart electric coil 16 and two spaced apart lobes 38. The number of lobes 38 and electric coils 16 can vary from case to case. Depending upon the particular design, the electric coils 16 may be wired electrically in series, in parallel, or some combination thereof and connected to a power supply. It is preferred to use a standard 125 volt dc or 250 volt dc power supply that is readily available industrially at many kilowatt ratings. The electric coils 16 are arranged so that passing electric current through the wire of the electric coils 16 causes a magnetic field to be formed in the central passageway P to retard a flow of the liquid molten steel 12 or other electrically conductive liquid through the central passageway P. The electric coils 16 may be constructed of solid conductor and externally cooled. Preferably, the coils are axisymmetric about axes Z', Z", Z''' and Z'''' which are parallel to the Z axis and spaced an equidistance. Alternately, they may be constructed with hollow conductor and internally cooled by gas or liquid. It is likely that liquid cooling with, for example, a water-glycol mixture, is preferred for the steel use. As mentioned above, pole rings 22 serve to direct the magnetic flux into the liquid molten steel 12. A feature of the axisymmetric configuration of the present invention is the increase in the flux density in the region of the central tube 14 and liquid molten steel 12. All of the magnetic flux from each lobe 38 is directed to a respective quadrant of the liquid molten steel 12 and the central tube 14. Since the lobes 38 are evenly spaced about the central tube 14 and, in this case, four lobes 38 are provided for each end plate 18, the magnetic flux of each lobe 38 is directed to one-quarter or one quadrant of the liquid molten steel 12 and the central tube 14. All of the magnetic flux in each of the end plates 18 flows through a single quadrant of the liquid molten steel 12 and the central tube 14. Since the total amount of flux in each magnetic path is constant (equal to the ampere turns in each coil divided by the reluctance of the circuit) as the area decreases with r, the flux density B increases.

In operation, the flow of liquid molten steel 12 through the central tube 14 is controlled by the magnetic field as shown in FIG. 2. This is controlled by the electric power passing through the coils. More specifically, an electrically conducting liquid's flow can be controlled by passing an electrically conducting liquid through a tube that is transparent to a magnetic field; directing a plurality of circumferentially positioned magnetic fields toward the tube; and controlling the flow of the electrically conducting liquid by the strength of the magnetic fields. The circumferentially spaced magnetic fields can be provided by a plurality of circumferentially spaced electric coils positioned about the tube. The magnetic field is controlled by the electric power passing through the coils, increasing the power to increase the magnetic field and decreasing the power to decrease the magnetic field.

Figure 8:
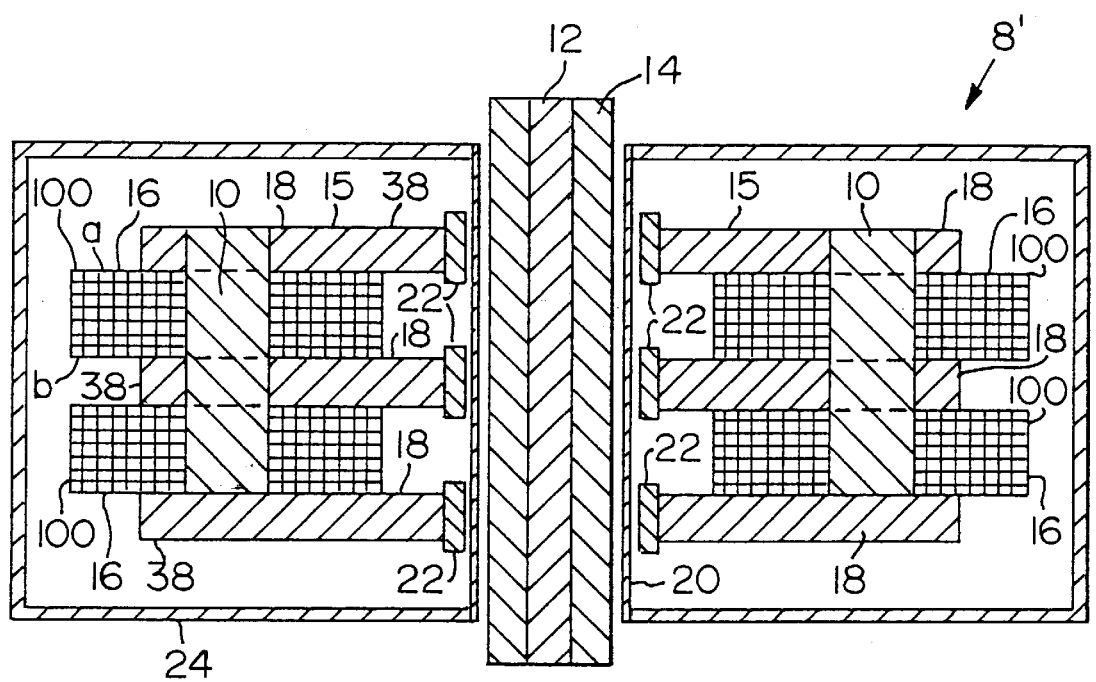
FIG. 8 is an elevational view in section of the second embodiment of the electromagnetic flow control valve shown in FIG. 7 contained within a casing.
Figure 9:
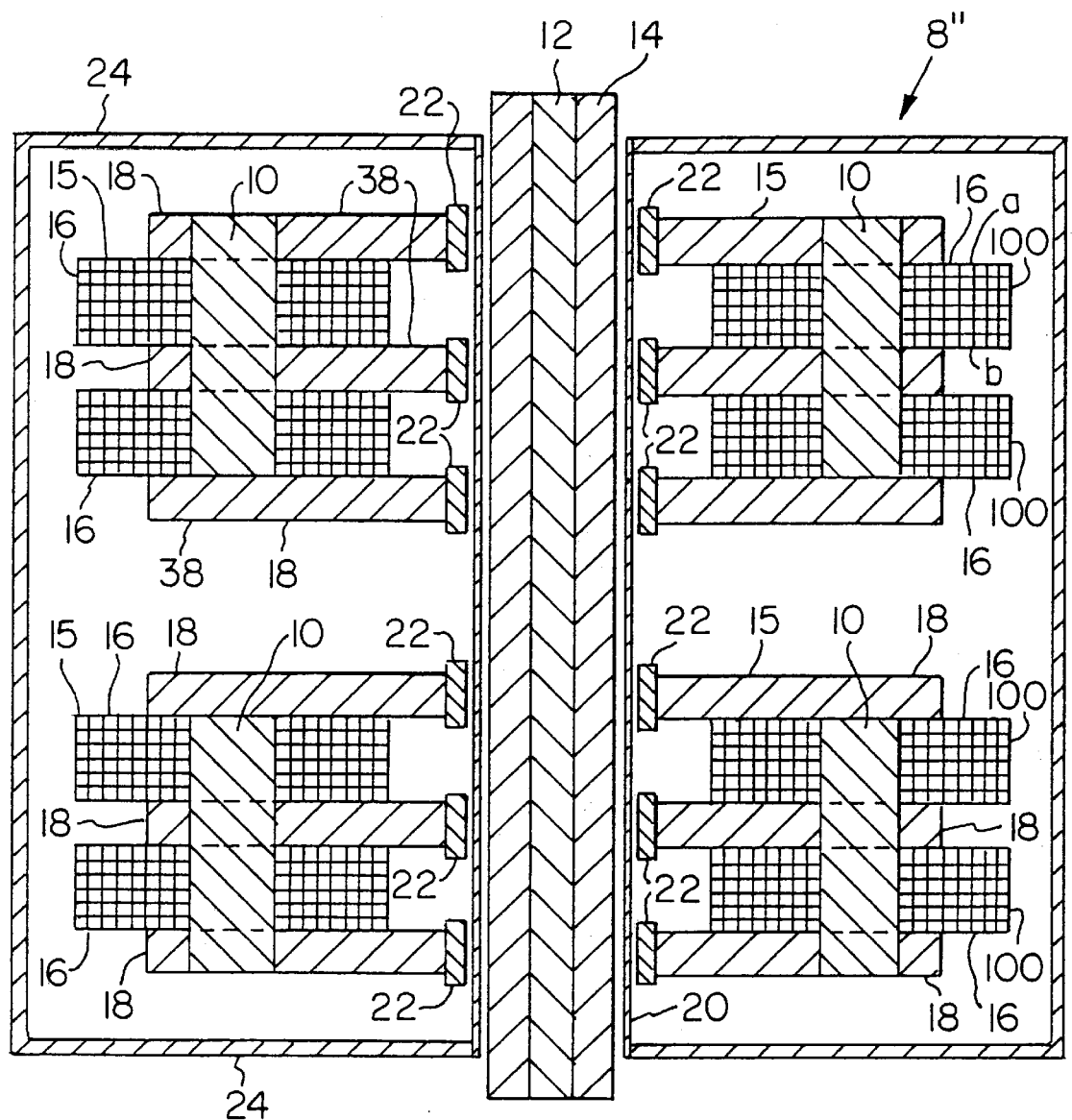
FIG. 9 is an elevational view in section of a third embodiment of an electromagnetic flow control valve made in accordance with the present invention.

FIGS. 7–9 show alternate embodiments of electromagnetic flow control valves 8' and 8" with the use of more than one assembly 15 in the longitudinal direction. Like reference numerals are used for like elements. Greater amounts of flow retardation may be accomplished by vertically stacking end plates and coil assemblies 15. For redundancy reasons, each layer 100 may be separately powered. There may be any number of layers 100 in an assembly 15 which are consistent with the total flow retarding requirements and the available space. The coil in each layer may have the current flow in the same or in the opposite sense to the coils in the adjacent layer. These embodiments operate in the same manner as the previous electromagnetic flow control valve 8. Since the only difference between the embodiments shown in FIGS. 7–9 is this stacking feature, no further discussions are necessary.

As is now evident, the electromagnetic flow control valves 8, 8' and 8" do not require high frequency alternating current for operation; do not require any kind of special internal passages to direct flow; are compact in size, readily manufacturable and are low in cost; and do not require high power for operation.

Figure 10:
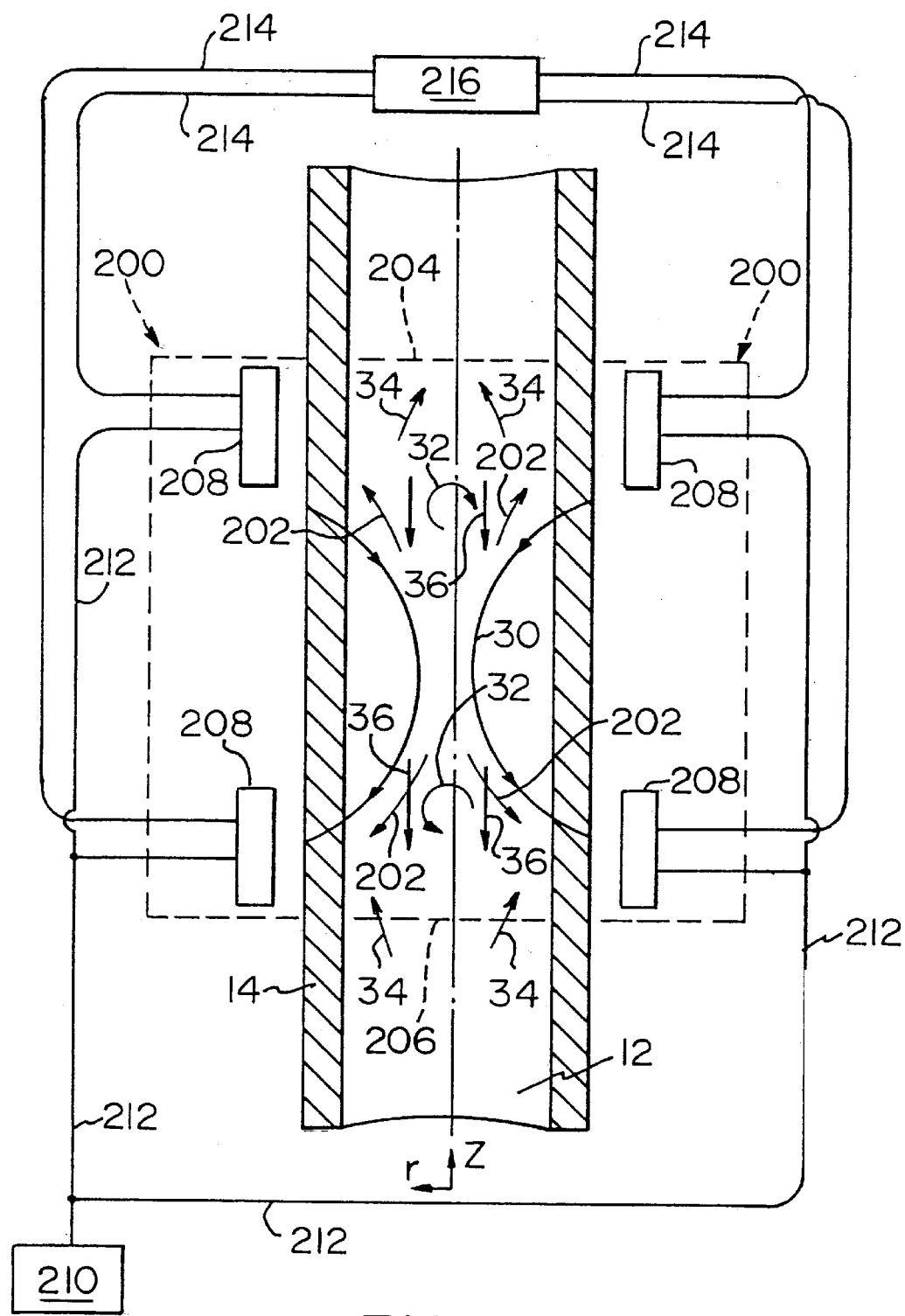
FIG. 10 is a section similar to FIG. 5 that further includes a flow measuring device made in accordance with the present invention.

FIG. 10 shows a measuring arrangement 200 for measuring flow of liquid molten steel 12 or other electrically conductive liquid through the central passageway P of the central tube 14. The flow measuring arrangement 200 designated in phantom does not depend on making electrical contact with the liquid molten steel 12 or other electrically conductive liquid nor measuring a pressure drop across the central tube 14.

Like FIG. 5, FIG. 10 shows the basic pattern of the magnetic field B designated as reference numeral 30, circulating eddy currents J designated as reference numeral 32, axial body force F designated as reference numeral 34 and velocity vectors V designated as reference numeral 36 on a radial plane passing through the device. In magnetohydrodynamics, the Magnetic Reynold's Number $R_m$ characterizes the ratio of the induced magnetic field to the applied magnetic field $\Delta B$. Symbolically, $$R_m = V \cdot d \cdot \sigma \cdot \mu°$$

where
V=velocity
d=diameter
σ=conductivity
$\mu°$=permeability of free space

The Magnetic Reynold's number of the liquid molten steel 12 or other electrically conductive liquid passing through the central passageway P in this device and is generally less than one. For example, an estimate for a billet caster, $R_m \cong 0.06$. Since the Magnetic Reynold's number is less than one, the magnetic field ΔB resulting from the circulating current density J is much less than the magnetic applied field B. However, the internally generated or induced magnetic field ΔB is not equal to zero.

FIG. 10 shows a pattern of induced or self generated axial magnetic fields B designated as reference numeral 202 positioned at an inlet or end region 204 and at an outlet or end region 206 of the flow measuring arrangement 200. The applied magnetic field vectors 30 of the flow measuring arrangement 200, point in the same general direction as the velocity vectors 36 of the liquid molten steel 12 or other electrically conductive liquid. In the inlet 204 of the flow measuring arrangement 200, the self generated magnetic field 202 points axially opposite to the applied magnetic field 30; while in the exit 206 of the flow measuring device, the self generated magnetic field 202 points axially in the same direction as the applied magnetic field 30. Thus:

In the inlet, $B_i = B - \Delta B$, where the net magnetic field decreases by a small amount In the exit, $B_e = B + \Delta B$ the net field increases by a small amount where $B_i$=net inlet magnetic field
$B_e$=net exit magnetic field
ΔB=internally generated magnetic axial field
B=externally applied magnetic field The net axial fields $B_i$ and $B_e$ are measured by any suitable arrangement, such as probes or sensors 208, which produce measurable galvanomagnetic effect, positioned exteriorly of the central tube 14 adjacent the outer surface thereof. Galvanomagnetic effects are well known in the art and include Hall effect, as described in Volume II of *Physics*, Halliday & Resnick© 1962, pp. 827–829. The Hall effect can be measured by Hall sensors or probes. Such a probe is the Model 410 Gaussmeter, sold and manufactured by:

Lake Shore Cryotronico, Inc.
64 East Walnut Street
Westernville, Ohio 43081

The Hall sensors 208 are axially spaced and positioned at the inlet 204 and the outlet 206 of the flow measuring device. A plurality of sensors 208 can be used for reducing and averaging of similar signals around the periphery of the central tube 14. A heat shield can be provided to protect the Hall sensors 208 from the heat of the molten steel 12 or other electrically conductive liquid.

The Hall sensors 208 are powered by a power supply 210, which is electrically coupled to the Hall sensors 208 through wires 212. Output signals from the Hall sensors 208 pass through wires 214 to a module such as a computer designated as block 216, to sum and subtract, i.e., analyze, the signals. The output signals emitted by the Hall sensors correlate to the magnetic fields. Alternatively, electric circuits can be provided to add and subtract the signals. Circuits and computer programs to add and subtract signals are well known in the art and, therefore, the specifics of the computer and/or the electric circuits will not be discussed in further detail.

By simple Algebra, involving equation $B_i$ and equation $B_e$, it can be seen that:

$$\frac{\Delta B}{B} = \frac{(B_e - B_i)}{(B_e + B_i)}$$

Since the circulatory current density J in each region act similar to a solenoid since they go around the axis circumferentially, ΔB is proportional to the magnitude of J. As previously stated, J=σ(V×B) since E=zero due to the axis symmetric configuration.

Hence, $V \propto \sigma \cdot \frac{(B_e - B_i)}{(B_e + B_i)}$ or $$V = K \cdot \sigma \frac{(B_e - B_i)}{(B_e + B_i)}$$

Where K is an empirical constant of proportionality.

Thus, V the velocity of the liquid molten steel 12 or other electrically conductive fluid, is determined from the signals generated by the Hall sensors 208. The flow rate Q is determined using the flow area of the central tube 14 and the nature of the flow distribution, i.e., the flow profile. For a cylindrical pipe the flow area is π×(Pipe inner radius)². In general, the flow will be turbulent with a slug like profile for most casting situations, which means the axially velocity can be assumed to be approximately constant throughout the flow area. The constant of proportionality K is initially determined by conducting tests running a known laboratory metal, such as Wood's metal, through the tube 14.

Thus, the flow rate can be determined as follows:

$$Q = K \cdot \sigma \cdot A \frac{(B_e - B_i)}{(B_e + B_i)}$$

K and A can be replaced by a constant since both of these values are constant.

Having described the presently preferred embodiments of the invention, it is to be understood that it may otherwise be embodied within the scope of the appended claims.

I claim:

1. A flow meter for measuring an electrically conductive liquid, comprising:
   an axially extending tube, said tube defining a central passageway adapted to permit an electrically conductive liquid to pass therethrough;
   a plurality of Hall sensors positioned axially along said tube;
   combining means for combining signals generated by said Hall sensors to determine flow rate through said tube; and
   an electromagnetic flow control valve that includes:
   a plurality of electric coils positioned circumferentially about said tube, said coils formed of electrically conductive wire whereby passing electric current through said wires of said coils causes a magnetic field to be formed in said central passageway which retards a flow of electrically conductive liquid through the central passageway.

2. A flow meter as claimed in claim 1, wherein said tube is transparent to a magnetic field.

3. A flow meter as claimed in claim 2, wherein said tube comprises ceramic material.

4. A flow meter as claimed in claim 3, wherein said ceramic material comprises alumina.

5. A flow meter as claimed in claim 1, wherein said Hall sensors measure a magnetic field at an inlet end and an exit end and said Hall sensors emit signals that correlate to the magnetic fields.

6. A flow meter as claimed in claim 1, wherein each of said Hall sensors measure a magnetic field and emit a magnetic field signal that correlates to the magnetic field and said combining means inputs the magnetic field signals in the following equation:

flow rate=constant·fluid electrical conductivity (net exit magnetic field−net inlet magnetic field)/(net exit magnetic field+net inlet magnetic field).

7. A flow meter as claimed in claim 1, wherein each of said coils defines a coil passageway and each of said coils receives a core in said coil passageway.

8. A flow meter as claimed in claim 7, wherein said core comprises a high permeability material.

9. A flow meter as claimed in claim 8, wherein said high permeability material comprises iron.

10. A flow meter as claimed in claim 1, further comprising end plates, each of said coils having a first end and a second end, said end plates sandwich said coils between said first ends and said second ends.

11. A flow meter as claimed in claim 10, wherein each of said end plates comprises a high permeability material.

12. A flow meter as claimed in claim 11, wherein said high permeability material comprises iron.

13. A flow meter as claimed in claim 10, wherein said end plates comprise a plurality of projections secured to each other.

14. A flow meter as claimed in claim 13, wherein said end plates projections are lobes.

15. A flow meter as claimed in claim 13, wherein each of said coils receives a core in a coil passageway defined in respective ones of said coils and respective ones of said cores coact with a respective pair of said projections.

16. A flow meter as claimed in claim 10, further comprising two longitudinally spaced apart annular-shaped pole rings, said pole rings attached to respective ones of said end plates and said tube passing through said pole rings.

17. A flow meter as claimed in claim 16, wherein each of said end plates comprises a plurality of projections, wherein pairs of projections receive respective ones of said electric coils.

18. A flow meter as claimed in claim 17, wherein each of said coils receives a core in a coil passageway defined in respective ones of said coils and respective ones of said cores coact with said respective pairs of said projections.

19. A method for measuring the flow rate of an electrically conducting liquid, comprising the steps of:

passing an electrically conducting liquid through an axially extending tube that is transparent to a magnetic field;

measuring magnetic fields of the passing electrically conductive liquid at least two axially spaced points along the tube, wherein one of the points is an exit and the other point is an inlet determining the flow rate of the electrically conducting liquid through the following equation $$Q = K \cdot \sigma \cdot A \frac{(B_e - B_i)}{(B_e + B_i)}$$

where

Q=flow rate

K=constant

A=flow tube area $B_e$=net exit magnetic field $B_i$=net inlet magnetic field

σ=electrical conductivity of the electrically conducting liquid.

20. The method as claimed in claim 19, further comprising the steps of:

directing a plurality of circumferentially positioned magnetic fields toward the tube; and controlling the flow of the electrically conducting liquid by the strength of the magnetic fields.

21. The method as claimed in claim 20, wherein the circumferentially positioned magnetic fields are provided by a plurality of circumferentially spaced electric coils.

22. A flow meter for measuring an electrically conductive liquid, comprising:

an axially extending tube, said tube defining a central passageway adapted to permit an electrically conductive liquid to pass therethrough, said tube is transparent to a magnetic field and comprises a ceramic material;

a plurality of Hall sensors positioned axially along said tube; and combining means for combining signals generated by said Hall sensors to determine flow rate through said tube.

23. A flow meter as claimed in claim 22, wherein said ceramic material comprises alumina.

24. A flow meter for measuring an electrically conductive liquid, comprising:

an axially extending tube, said tube defining a central passageway adapted to permit an electrically conductive liquid to pass therethrough;

a plurality of Hall sensors positioned axially along said tube, wherein said Hall sensors measure a magnetic field at an inlet end and an exit end and said Hall sensors emit signals that correlate to the magnetic fields; and combining means for combining signals generated by said Hall sensors to determine flow rate through said tube.

25. A flow meter for measuring an electrically conductive liquid, comprising:

an axially extending tube, said tube defining a central passageway adapted to permit an electrically conductive liquid to pass therethrough;

a plurality of Hall sensors positioned axially along said tube; and combining means for combining signals generated by said Hall sensors to determine flow rate through said tube, wherein each of said Hall sensors measure a magnetic field and emit a magnetic field signal that correlates to the magnetic field and said combining means inputs the magnetic field signals in the following equation:

flow rate=constant·fluid electrical conductivity (net exit magnetic field−net inlet magnetic field)/(net exit magnetic field+net inlet magnetic field).

* * * * *

UNITED STATES PATENT AND TRADEMARK OFFICE
CERTIFICATE OF CORRECTION

PATENT NO.   : 6,321,766 B1
DATED        : November 27, 2001
INVENTOR(S)  : Richard D. Nathenson It is certified that error appears in the above-identified patent and that said Letters Patent is hereby corrected as shown below:

Column 11,
Line 29, after "assemblies" insert -- 15 --.

Column 13,
Line 12, "field AB" should read -- field ΔB --.

Column 15,
Line 13, after "constant · fluid electrical conductivity" insert -- · --.

Column 16,
Line 63, after "conductivity" insert -- · --.

Signed and Sealed this

Fourth Day of June, 2002

*Attest:*

JAMES E. ROGAN
*Director of the United States Patent and Trademark Office*

*Attesting Officer*